(12) United States Patent
Akagawa

(10) Patent No.: US 10,838,290 B2
(45) Date of Patent: Nov. 17, 2020

(54) LIGHT SOURCE DEVICE AND PROJECTOR

(71) Applicant: SEIKO EPSON CORPORATION, Tokyo (JP)

(72) Inventor: Tomoko Akagawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/524,539

(22) Filed: Jul. 29, 2019

(65) Prior Publication Data

US 2020/0033708 A1 Jan. 30, 2020

(30) Foreign Application Priority Data

Jul. 30, 2018 (JP) .................................. 2018-142210

(51) Int. Cl.
*G03B 21/14* (2006.01)
*G03B 21/20* (2006.01)
*F21V 8/00* (2006.01)

(52) U.S. Cl.
CPC ......... *G03B 21/204* (2013.01); *G02B 6/0008* (2013.01); *G03B 21/2066* (2013.01); *G03B 21/2073* (2013.01)

(58) Field of Classification Search
CPC .............................. G02B 6/0003; G02F 1/1336
See application file for complete search history.

(56) References Cited

U.S. PATENT DOCUMENTS

| 9,482,939 | B2 * | 11/2016 | Moon | H04N 5/76 |
| 2017/0102607 | A1 * | 4/2017 | Huang | G03B 21/005 |
| 2020/0033707 | A1 * | 1/2020 | Sakata | H04N 9/3152 |
| 2020/0192209 | A1 * | 6/2020 | Kumai | G03B 21/2073 |

FOREIGN PATENT DOCUMENTS

JP 2011-138627 A 7/2011

* cited by examiner

*Primary Examiner* — William C. Dowling
(74) *Attorney, Agent, or Firm* — Dority & Manning, P.A.

(57) ABSTRACT

A light source device includes a light source section that emits excitation light, a phosphor that emits fluorescence, a light guide having a light incidence surface, a light exit surface and a side surface crossing the light incidence surface and the light exit surface, and configured to propagate light entered an inside of the light guide, a reflective polarization element disposed to be opposed to the light exit surface, and configured to reflect first polarized light with a first polarization direction out of the fluorescence emitted from the light exit surface, and transmit second polarized light with a second polarization direction different from the first polarization direction out of the fluorescence emitted from the light exit surface, and a reflecting member disposed to be opposed to a part of the side surface of the light guide, wherein the phosphor is disposed at a position opposed to the light incidence surface.

9 Claims, 3 Drawing Sheets

LIGHT SOURCE DEVICE AND PROJECTOR

The present application is based on, and claims priority from JP Application Serial Number 2018-142210, filed Jul. 30, 2018, the disclosure of which is hereby incorporated by reference herein in its entirety.

BACKGROUND

1. Technical Field

The present disclosure relates to a light source device and a projector.

2. Related Art

In the past, as a light source device used for a projector, there has been a light source device having a laser light source for emitting excitation light, a phosphor for emitting fluorescence when excited by the excitation light, a light guide and a reflective polarization element (see, e.g., JP-A-2011-138627 (Document 1)).

In the reflective polarization element, only a predetermined polarization component out of the light propagating in the light guide and then emitted from the light exit surface is transmitted, and the other polarization components are reflected toward the inside of the light guide. The light reflected by the reflective polarization element partially changes to the light with the predetermined polarization component by being reflected by the light guide or the phosphor, and thus, becomes to be transmitted through the reflective polarization element. By repeating the above a plurality of times, the polarization directions of the light emitted from the light exit surface of the light guide are uniformed into the polarization direction the light with which can be transmitted through the reflective polarization element, and thus, the light use efficiency is enhanced.

However, in the light source device described in Document 1, there is a problem that a part of the light reflected by the reflective polarization element fails to totally be reflected by the inner surface of the light guide, but is emitted to the outside to thereby cause a light loss.

SUMMARY

A light source device according to an aspect of the present disclosure includes a light source section configured to emit excitation light, a phosphor excited by the excitation light to emit fluorescence, a light guide having a light incidence surface, a light exit surface and a side surface crossing the light incidence surface and the light exit surface, and configured to propagate the light entered an inside of the light guide, a reflective polarization element disposed so as to be opposed to the light exit surface of the light guide, and configured to reflect first polarized light with a first polarization direction out of the fluorescence emitted from the light exit surface, and transmit second polarized light with a second polarization direction different from the first polarization direction out of the fluorescence emitted from the light exit surface, and a reflecting member disposed so as to be opposed to at least a part of the side surface of the light guide, wherein the phosphor is disposed at a position opposed to the light incidence surface of the light guide.

In the light source device according to the aspect of the present disclosure, the reflecting member may be disposed on the light incidence surface side of a middle part of the light guide.

In the light source device according to the aspect of the present disclosure, the reflecting member may be opposed to the light guide with a space.

In the light source device according to the aspect of the present disclosure, there may further be included a low refractive index layer which is lower in refractive index than the light guide, and which is disposed in the space. In this case, the low refractive index layer may be formed of a first air layer.

In the light source device according to the aspect of the present disclosure, the light guide may be a taper rod with the side surface having a shape tilted with respect to the light incidence surface and the light exit surface.

The light source device according to the aspect of the present disclosure may further include a second air layer disposed between the phosphor and the light incidence surface of the light guide.

In the light source device according to the aspect of the present disclosure, the light source section may be a laser light source.

A projector according to another aspect of the present disclosure includes the light source device according to any one of the above aspects of the present disclosure, a light modulation device configured to modulate light from the light source device in accordance with image information, and a projection optical device configured to project the light modulated by the light modulation device.

DESCRIPTION OF EXEMPLARY EMBODIMENTS

First Embodiment

Hereinafter, a first embodiment of the present disclosure will be described using FIG. 1 and FIG. 2.

Figure 1:
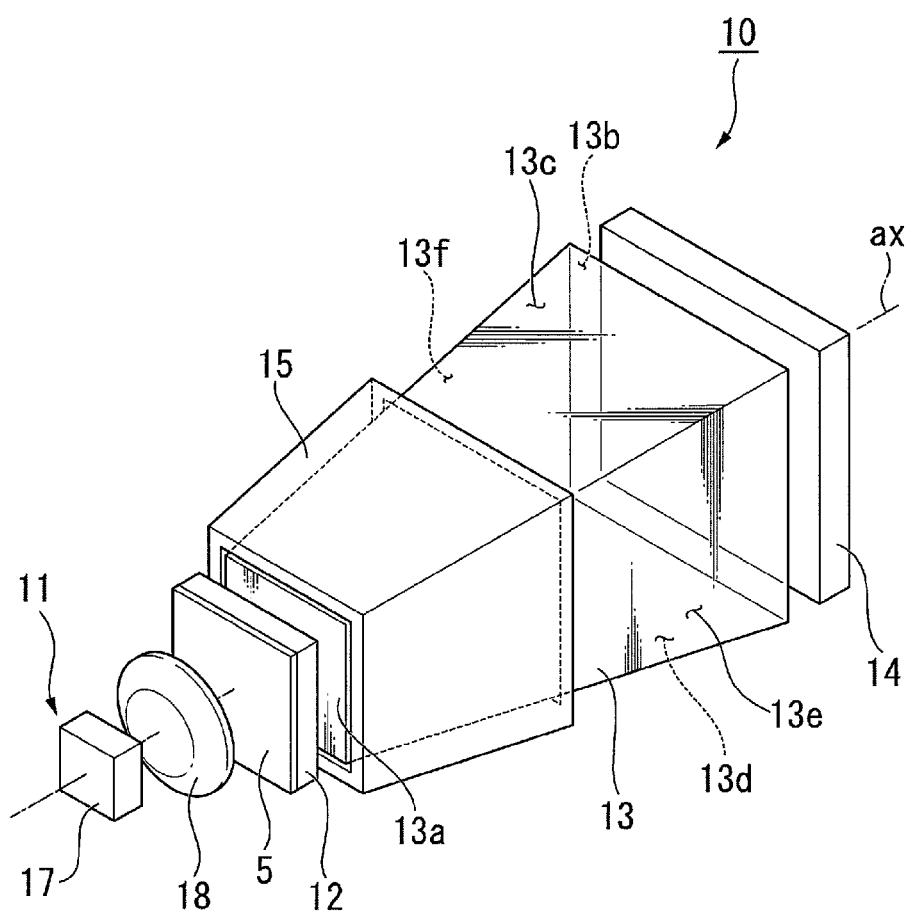
FIG. 1 is a perspective view of a light source device according to a first embodiment.

FIG. 1 is a perspective view of the light source device 10 according to the first embodiment. FIG. 2 is a cross-sectional view of the light source device 10.

It should be noted that in each of the drawings described below, the constituents are shown with the scale ratios of respective sizes set differently between the constituents in some cases in order to facilitate the visualization of each of the constituents.

Figure 2:
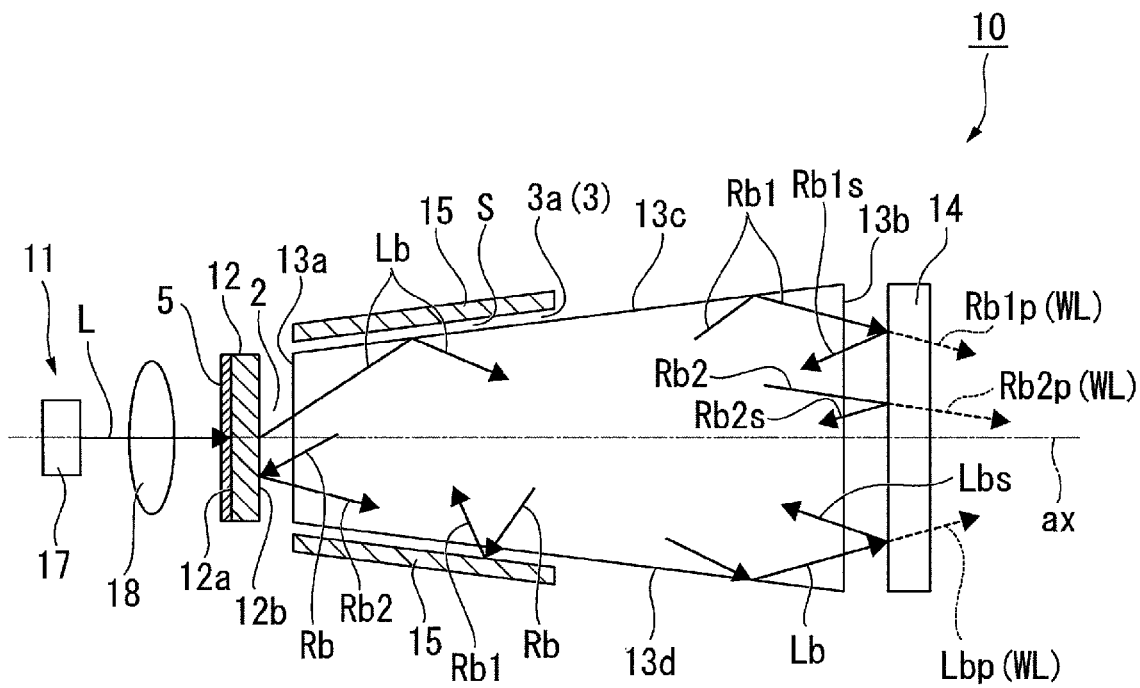
FIG. 2 is a cross-sectional view of the light source device.

As shown in FIG. 1 and FIG. 2, the light source device 10 according to the first embodiment is provided with a light source section 11, a phosphor 12, a light guide 13 having a light incidence surface 13a shaped like a rectangle and a light exit surface 13b, a reflective polarization element 14 and a reflecting mirror (a reflecting member) 15. The light source section 11, the phosphor 12, the light guide 13 and the reflective polarization element 14 are arranged along an illumination light axis ax of the light source device 10.

The light source section 11 has a laser light source 17 and a light collection optical system 18. The laser light source 17 is formed of a semiconductor laser for emitting excitation light L in a predetermined wavelength band for exciting the phosphor 12. The laser light source 17 can include a single semiconductor laser, or can also include a plurality of semiconductor lasers. It should be noted that the laser light source 17 can also be formed of a semiconductor laser for emitting a laser beam in a different wavelength range.

The light collection optical system 18 collects the light from the laser light source 17 to make the light enter the phosphor 12. The light collection optical system 18 is formed of one lens or two or more lenses.

The phosphor 12 has a light incidence surface 12a which the excitation light L enters, and a light exit surface 12b for emitting the fluorescence. The phosphor 12 absorbs the excitation light L emitted from the light source section 11 to thereby be excited. The phosphor 12 excited by the excitation light L emits blue light (fluorescence) Lb in a wavelength band of, for example, 400 through 550 nm.

The blue light Lb is non-polarized light. In the present embodiment, since the laser light source 17 is used as an excitation light source for emitting the excitation light L, by exciting the phosphor 12 with the excitation light L having a predetermined wavelength band, it is possible to efficiently generate the blue light Lb.

The phosphor 12 of the present embodiment is formed of, for example, a polycrystalline phosphor having air holes. By using such a polycrystalline phosphor, it becomes easy to manufacture the phosphor 12. A side surface 12c of the phosphor 12 is provided with a reflecting film 4 for reflecting the blue light Lb. Further, the light incidence surface 12a of the phosphor 12 is provided with a dichroic film 5 for reflecting the blue light Lb and transmitting the excitation light L. According to this configuration, the blue light Lb generated in the phosphor 12 and then proceeding toward the light incidence surface 12a is reflected by the dichroic film 5, and can thus efficiently be extracted to the outside from the light exit surface 12b. Therefore, the use efficiency of the blue light Lb is enhanced.

It should be noted that the fluorescence emitted from the phosphor 12 is not limited to the blue light, but can also be, for example, green light in a wavelength band of 450 through 650 nm or red light in a wavelength band of 550 through 700 nm due to a combination with the wavelength band of the excitation light.

In the present embodiment, the phosphor 12 is provided with an air layer (a second air layer) 2 disposed between the phosphor 12 and the light incidence surface 13a of the light guide 13. The smaller the thickness of the air layer 2 is the better, and the thickness is set to, for example, no larger than 100 μm, more preferably no larger than 10 μm.

This is because since the radiation angle of the blue light Lb emitted from the phosphor 12 is large, when the thickness of the air layer 2 becomes too large, a component failing to be captured by the light incidence surface 13a increases to cause the light loss. Further, by disposing the air layer 2 between the light incidence surface 13a and the phosphor 12, it is possible to make the light incidence surface 13a function as a reflecting surface for totally reflecting the light propagating in the light guide 13.

In the present embodiment, the size of the light exit surface 12b in the phosphor 12 when making a plan view of the light exit surface 12b is set to be larger than or substantially the same as the size of the light incidence surface 13a in the light guide 13 when making a plan view of the light incidence surface 13a.

The light guide 13 emits a part of the light having propagated inside the light guide 13 from the light exit surface 13b while propagating the light having entered the inside from the light incidence surface 13a with total reflection. The light guide 13 is formed of a rod extending in a direction of a central axis 13C, and has a first side surface 13c, a second side surface 13d, a third side surface 13e and a fourth side surface 13f besides the light incidence surface 13a and the light exit surface 13b. It should be noted that the central axis 13C of the light guide 13 coincides with the illumination light axis ax of the light source device 10.

The light incidence surface 13a is a surface crossing (perpendicular to) the central axis 13C, and is located on one end side of the central axis 13C. The blue light Lb emitted from the phosphor 12 enters the light incidence surface 13a. The light exit surface 13b is a surface perpendicular to the central axis 13C, and is located on the other end side of the central axis 13C. The light exit surface 13b emits the light having propagated in the light guide 13 to the outside.

The first side surface 13c connects one of the sides of the light incidence surface 13a and corresponding one of the sides of the light exit surface 13b (the sides on the upper side in FIG. 1) to each other. The second side surface 13d connects one of the sides of the light incidence surface 13a and corresponding one of the sides of the light exit surface 13b (the sides on the lower side in FIG. 1) to each other. The third side surface 13e connects one of the sides of the light incidence surface 13a and corresponding one of the sides of the light exit surface 13b (the sides on the right side in FIG. 1) to each other, and at the same time, connects one of the sides of the first side surface 13c and corresponding one of the sides of the second side surface 13d (the sides on the right side in FIG. 1) to each other. The fourth side surface 13f connects one of the sides of the light incidence surface 13a and corresponding one of the sides of the light exit surface 13b (the sides on the left side in FIG. 1) to each other, and at the same time, connects one of the sides of the first side surface 13c and corresponding one of the sides of the second side surface 13d (the sides on the left side in FIG. 1) to each other.

As shown in FIG. 1, the light guide 13 of the present embodiment has a taper shape in which the cross-sectional area crossing (perpendicular to) the central axis 13C expands in a direction from the light incidence surface 13a toward the light exit surface 13b. In other words, the distance between the first side surface 13c and the second side surface 13d is longer on the light exit surface 13b side than on the light incidence surface 13a side. The light guide 13 of the present embodiment is a taper rod having a shape in which the side surfaces (the first side surface 13c, the second side surface 13d, the third side surface 13e and the fourth side surface 13f) are tilted with respect to the light incidence surface 13a and the light exit surface 13b.

The light guide 13 of the present embodiment is formed of a light transmissive material such as optical glass including borosilicate glass such as BK7, quartz glass and synthetic silica glass, quartz crystal or sapphire.

The reflective polarization element 14 has a function of performing polarization split on the blue light Lb having emitted from the light exit surface 13b of the light guide 13. Specifically, the reflective polarization element 14 reflects S-polarized light Lbs (first polarized light with a first polarization direction) with respect to the reflective polarization element 14 out of the blue light Lb, and transmits P-polarized light Lbp (second polarized light with a second polarization direction) with respect to the reflective polarization element 14 out of the blue light Lb.

The reflective polarization element 14 is formed of, for example, a wire grid polarizer. It should be noted that the reflective polarization element 14 can also be formed of a reflective polarization plate of an organic, inorganic or crystalline type providing the polarization split characteristic described above is provided.

In the present embodiment, the distance between the light exit surface 13b of the light guide 13 and the reflective polarization element 14 is set to, for example, no larger than 100 μm, and for preferably to no larger than 10 μm. By setting the distance between the light exit surface 13b and the reflective polarization element 14 to the range described above, the blue light Lb emitted from the light guide 13 can be made to efficiently enter the reflective polarization element 14. Therefore, it is possible to efficiently use the blue light Lb.

The reflecting mirror 15 is formed of a material high in reflectance such as silver or aluminum. Further, the reflecting mirror 15 can also be formed of a dielectric multilayer film. The reflecting mirror 15 is disposed so as to be opposed to at least a part of the side surfaces of the light guide 13. In the present embodiment, the reflecting mirror 15 is disposed so as to be opposed to a part of each of the first side surface 13c, the second side surface 13d, the third side surface 13e and the fourth side surface 13f.

More specifically, the reflecting mirror 15 is disposed on the light incidence surface 13a side of a middle part 13M of the light guide 13 in each of the first side surface 13c, the second side surface 13d, the third side surface 13e and the fourth side surface 13f. It should be noted that the middle part 13M of the light guide 13 denotes a middle part in a direction along the central axis 13C.

The reflecting mirror 15 is opposed to the side surfaces of the light guide 13 across a space S. In the present embodiment, in the space S, there is disposed a low refractive index layer 3 having a refractive index lower than that of the light guide 13. In the present embodiment, the thickness of the low refractive index layer 3 is set to, for example, 1 μm. The low refractive index layer 3 is formed of an air layer (a first air layer) 3a.

It should be noted that it is also possible to dispose a resin material lower in refractive index than the light guide 13 in the space S as the low refractive index layer 3 instead of the air layer 3a. In this case, a resin material applied on the side surfaces of the light guide 13 can be used as a holding member for the reflecting mirror 15.

Subsequently, a function by the light source device 10 according to the present embodiment will be described.

In the light source device 10 having the configuration described above, the excitation light L emitted from the light source 11 enters the light incidence surface 12a of the phosphor 12 to generate the blue light Lb. The blue light Lb enter the light guide 13 from the light incidence surface 13a, and then proceeds toward the light exit surface 13b while being totally reflected by the side surfaces.

The blue light Lb proceeding inside the light guide 13 is converted in angle every time the blue light Lb is reflected by each of the side surfaces having the taper shape, and is therefore emitted as light substantially parallel to the illumination light axis ax when emitted from the light exit surface 13b. According to the light guide 13 of the present embodiment, since the taper shape is adopted, the blue light Lb can substantially be collimated and then emitted from the light exit surface 13b.

The blue light Lb having entered the light guide 13 propagates in the light guide 13 while being totally reflected to thereby emitted from the light exit surface 13b in the state in which the homogeneity of the illuminance distribution is enhanced. The blue light Lb enhanced in the homogeneity of the illuminance distribution by the light guide 13 enters the reflective polarization element 14.

The P-polarized light Lbp of the blue light Lb is transmitted through the reflective polarization element 14. The P-polarized light Lbp having been transmitted through the reflective polarization element 14 forms blue light WL as the illumination light by the light source device 10. The blue light WL is formed of linearly polarized light (P-polarized light).

Meanwhile, the S-polarized light Lbs of the blue light Lb is reflected by the reflective polarization element 14 to be returned to the inside of the light guide 13. The S-polarized light Lbs having been reflected by the reflective polarization element 14 proceeds toward the light incidence surface while being totally reflected inside the light guide 13.

The S-polarized light Lbs having been reflected by the reflective polarization element 14 and then entered the inside of the light guide 13 is hereinafter referred to as blue reflected light Rb.

Here, since the light guide 13 of the present embodiment has the taper shape, the blue reflected light Rb is converted in angle every time the blue reflected light Rb is reflected by the side surface having the taper shape, and the incident angle with respect to the side surface increases as the blue reflected light Rb approaches the light incidence surface 13a. Therefore, a part of the blue reflected light Rb having been reflected by the reflective polarization element 14 and then propagated inside the light guide 13 becomes to fail to fulfill the total reflection condition in the vicinity of the light incidence surface 13a in some cases.

In the light guide 13 of the present embodiment, even when partial light Rb1 of the blue reflected light Rb fails to fulfill the total reflection condition in the vicinity of the light incidence surface 13a, and is thus emitted outside the light guide 13, the partial light Rb1 can be reflected by the reflecting mirror 15 to thereby be returned to the inside of the light guide 13. Therefore, since the leakage of the partial light Rb1 to the outside can be prevented, it is possible to reduce an occurrence of the light loss.

In the light source device 10 according to the present embodiment, since the air layer 3a is disposed between the reflecting mirror 15 and the side surfaces of the light guide 13, it is possible to use the total reflection of the light while reducing the loss due to the light absorption by the reflecting mirror 15.

The partial light Rb1 having been reflected by the reflecting mirror 15 and returned to the inside of the light guide 13 propagates inside the light guide 13 with the total reflection, and is then emitted from the light exit surface 13b, and enters the reflective polarization element 14.

Here, the partial light Rb1 having been reflected by the reflecting mirror 15 changes to a different polarization state (non-polarized state) due to the reflection by the reflecting mirror 15. Therefore, since the reflective polarization element 14 reflects S-polarized light Rb1s out of the partial light Rb1 and transmits P-polarized light Rb1p out of the partial light Rb1, it is possible to reuse the P-polarized light Rb1p as the blue light WL.

Further, a part of the blue reflected light Rb having been reflected by the reflective polarization element 14 and then propagated inside the light guide 13 is transmitted through the light incidence surface 13a and then enters the phosphor 12. The blue reflected light Rb having entered the phosphor 12 is backward scattered by a plurality of air holes existing inside the phosphor 12, and then enters the light guide 13 as backward scattered light Rb2. The backward scattered light Rb2 propagates inside the light guide 13, and is then emitted from the light exit surface 13b, and then enters the reflective polarization element 14.

The backward scattered light Rb2 is changed to a different polarization state (non-polarized light) when backward scattered by the phosphor 12. Since the reflective polarization element 14 reflects S-polarized light Rb2s out of the backward scattered light Rb2 and transmits P-polarized light Rb2p out of the backward scattered light Rb2, it is possible to reuse the P-polarized light Rb2p out of the backward scattered light as the blue light WL.

Further, the S-polarized light Rb1s and the S-polarized light Rb2s described above which have been reflected by the reflective polarization element 14 and enters the light guide 13 propagate inside the light guide 13 as described above, and are at the same time changed to a different polarization state (non-polarized light) due to the reflection by the reflecting mirror 15 or the backward scattering by the phosphor 12, and therefore partially become reusable as the blue light WL in a similar manner.

As described above, in the light source device 10 according to the present embodiment, since a part of the blue light Lb reflected by the reflective polarization element 14 is reused as the blue light WL, it is possible to realize high light use efficiency.

Further, in the light source device 10 according to the present embodiment, since the light guide 13 is formed to have the taper shape, the blue light Lb is converted in angle every time the blue light Lb is reflected by each of the side surfaces having the taper shape. Therefore, it is possible to emit the blue light Lb from the light exit surface 13b as the blue light WL substantially parallel to the illumination light axis ax.

On the other hand, when the light guide 13 is formed to have the taper shape, the light which has been reflected by the reflective polarization element 14 and thus returned to the light incidence surface side is converted in angle every time the light is reflected by each of the side surfaces having the taper shape, and thus, the incident angle with respect to the side surface increases. Therefore, there is also a possibility that the light which has become to fail to fulfill the total reflection condition is transmitted through the side surface of the light guide 13 to thereby be emitted outside.

In contrast, in the light source device 10 according to the present embodiment, even when the light which has been reflected by the reflective polarization element 14 to thereby be returned to the light incidence surface side fails to fulfill the total reflection condition, such light is reflected by the reflecting mirror 15 disposed on the light incidence surface 13a side of the middle position 13M of the light guide 13 to be returned to the inside of the light guide 13, and thus, the occurrence of the light loss is reduced.

Further, in the present embodiment, since there is adopted the configuration in which the reflecting mirror 15 is disposed only in the vicinity of the light incidence surface 13a where the light which has become to fail to fulfill the total reflection condition occurs, it is possible to achieve the cost reduction compared to when disposing the reflecting mirror 15 in the entire side surfaces of the light guide 13.

Further, in the light source device 10 according to the present embodiment, since the reflecting mirror 15 is disposed so as to be opposed to the side surfaces of the light guide 13 across the space S, the occurrence of the loss due to the light absorption by the reflecting mirror 15 can be reduced compared to the configuration of directly disposing the reflecting mirror 15 on the side surfaces. In the present embodiment, since the air layer 3a is disposed in the space S as the low refractive index layer 3 having the refractive index lower than that of the light guide 13, it is possible to efficiently reflect the light using the total reflection.

Further, in the light source device 10 according to the present embodiment, since the light source section 11 has the laser light source 17, by exciting the phosphor 12 with the excitation light L having a predetermined wavelength band, it is possible to efficiently generate the blue light Lb.

Further, since the shape of the light exit surface 13b of the light guide 13 is a rectangular shape, the light source device 10 according to the present embodiment is suitable for illuminating the light modulation device having a rectangular display area when used as the light source device for the projector as described later.

It should be noted that although the case of configuring the reflective polarization element 14 with the wire grid polarizer is cited as an example in the first embodiment, it is also possible to configure the reflective polarization element with a polarization beam splitter.

Modified Example

Figure 3:
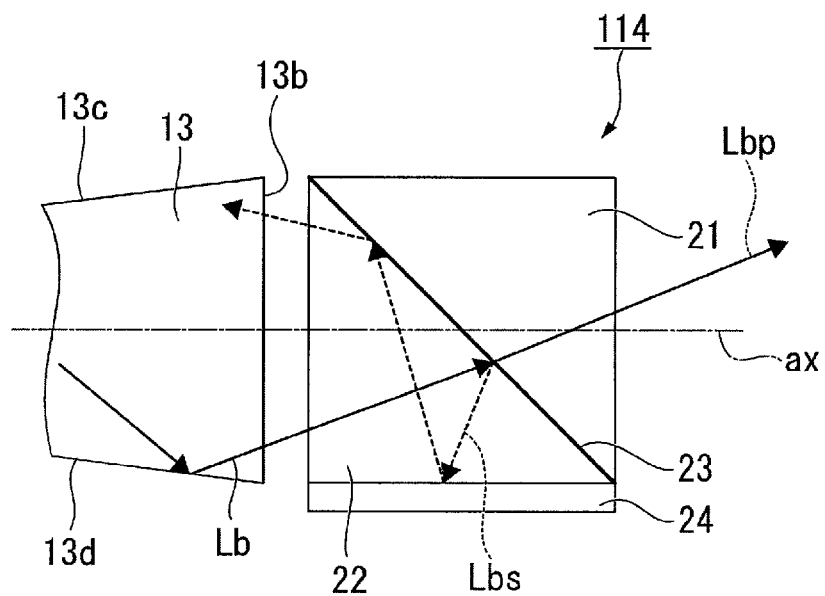
FIG. 3 is a diagram showing a reflective polarization element according to a modified example and a peripheral structure thereof.

FIG. 3 is a diagram showing a reflective polarization element according to a modified example and a peripheral structure thereof.

As shown in FIG. 3, the reflective polarization element 114 in the modified example is formed of a polarization beam splitter having two triangular prisms 21, 22, a polarization splitting film 23 disposed between the two triangular prisms 21, 22, and a reflecting mirror 24 provided to a side surface 22a of the right angle prism 22.

The polarization splitting film 23 has a function of performing polarization split on the blue light Lb having been emitted from the light exit surface 13b of the light guide 13. Specifically, the polarization split film 23 reflects S-polarized light Lbs (first polarized light with a first polarization direction) with respect to the reflective polarization element 14 out of the blue light Lb, and transmits P-polarized light Lbp (second polarized light with a second polarization direction) with respect to the reflective polarization element 14 out of the blue light Lb.

The distance between the light exit surface 13b of the light guide 13 and the reflective polarization element 114 is set to, for example, no larger than 100 μm, and for preferably to no larger than 10 μm. The reflecting mirror 24 is formed of a material high in reflectance such as silver or aluminum.

In the present modified example, the P-polarized light Lbp of the blue light Lb is transmitted through the polarization split film 23 in the reflective polarization element 114. Meanwhile, the S-polarized light Lbs of the blue light Lb is reflected by the polarization split film 23 in the reflective polarization element 114. It should be noted that the S-polarized light Lbs having been reflected by the polarization split film 23 also includes a component to directly be returned to the inside of the light guide 13 besides the component to be reflected again by the polarization split film 23 and returned to the light guide 13 after being reflected by the reflecting mirror 24 as shown in FIG. 3. The S-polarized light Lbs having been reflected by the reflective polarization element 114 proceeds toward the light incidence surface while being totally reflected inside the light guide 13.

As described above, also in the reflective polarization element 114 of the present modified example, similarly to the reflective polarization element 14 of the first embodiment, it is possible to perform the polarization split on the blue light Lb.

Second Embodiment

Hereinafter, a second embodiment of the present disclosure will be described using FIG. 4.

In the second embodiment, there is described an example of a projector equipped with the light source device according to the embodiment described above.

Figure 4:
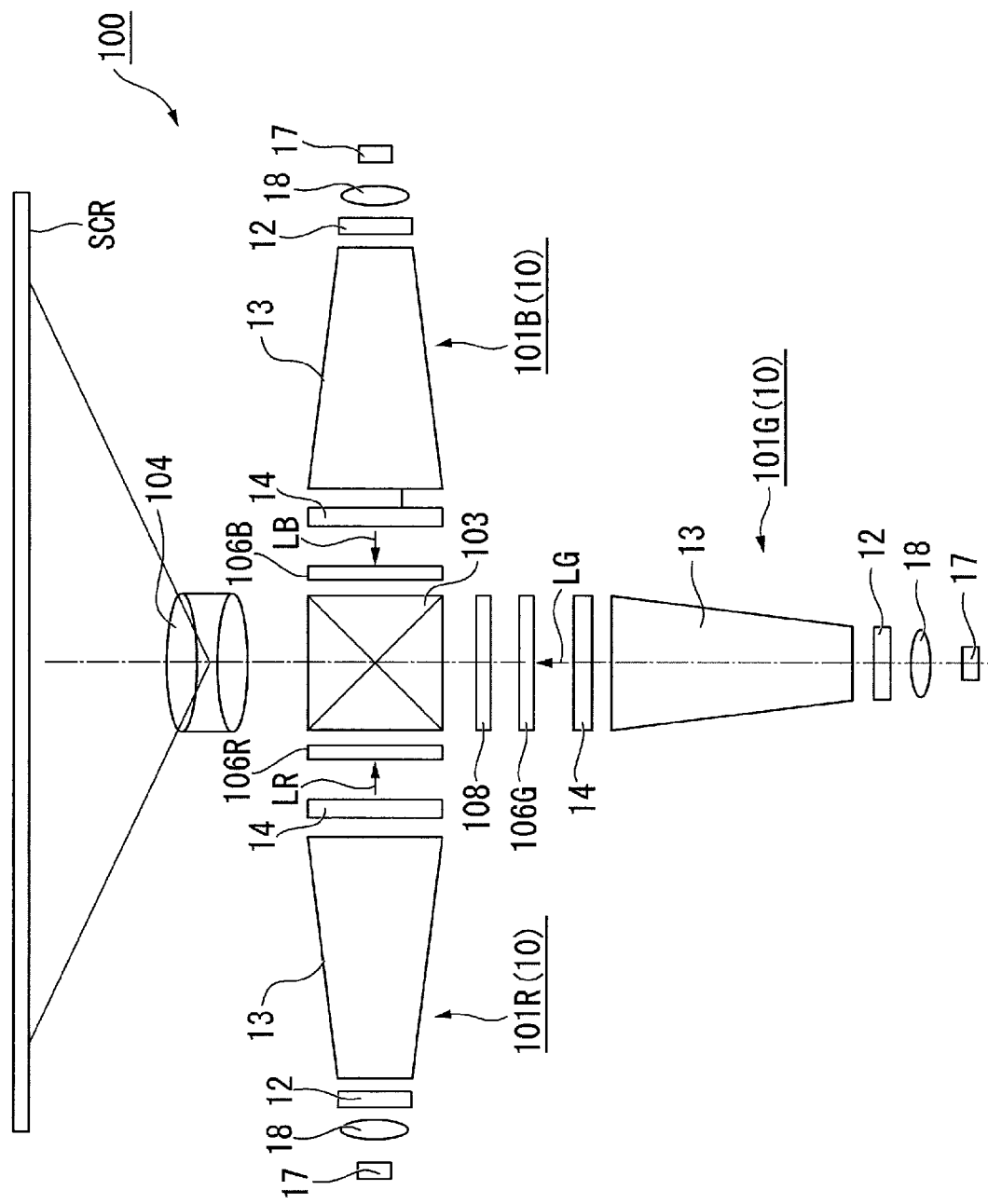
FIG. 4 is a schematic configuration diagram showing a projector according to a second embodiment.

FIG. 4 is a schematic configuration diagram showing the projector 100 according to the second embodiment.

In FIG. 4, the constituents common to the drawing used in the first embodiment are denoted by the same reference symbols, and the description thereof will be omitted.

As shown in FIG. 4, the projector 100 according to the present embodiment is provided with a red-light light source device (the light source device) 101R, a green-light light source device (the light source device) 101G, a blue-light light source device (the light source device) 101B, a red light-liquid crystal light valve (a light modulation device) 102R, a green light-liquid crystal light valve (a light modulation device) 102G, a blue light-liquid crystal light valve (a light modulation device) 102B, a red-light light exit side polarization plate 106R, a green-light light exit side polarization plate 106G, a blue-light light exit side polarization plate 106B, a ½ wave plate 108, a color combining element 103 and a projection optical device 104. It should be noted that the red light-liquid crystal light valve 102R, the green light-liquid crystal light valve 102G and the blue light-liquid crystal light valve 102B are omitted from the drawing.

In the present embodiment, the light source device 10 according to the first embodiment is used as each of the red-light light source device 101R, the green-light light source device 101G and the blue-light light source device 101B.

The projector 100 according to the present embodiment operates as generally described below.

Red light LR emitted from the red-light light source device 101R enters the red-light liquid crystal light valve 102R and is modulated.

Green light LG emitted from the green-light light source device 101G enters the green-light liquid crystal light valve 102G and is modulated.

Blue light LB emitted from the blue-light light source device 101B enters the blue-light liquid crystal light valve 102B and is modulated. It should be noted that the red light LR, the green light LG and the blue light LB are each linearly polarized light (P-polarized light).

The red light LR modulated by the red-light liquid crystal light valve 102R, the green light LG modulated by the green-light liquid crystal light valve 102G and the blue light LB modulated by the blue-light liquid crystal light valve 102B enter the color combining element 103 to be combined with each other.

The light combined by the color combining element 103 is emitted as image light to be projected on a screen SCR by the projection optical device 104 in an enlarged manner. In such a manner, a full-color projection image is displayed.

Hereinafter, each of the constituents of the projector 100 according to the present embodiment will be described.

The red-light light source device 101R, the green-light light source device 101G and the blue-light light source device 101B are different from each other only in color of the emitted light, and are the same in device configuration.

As an example, the red-light light source device 101R efficiently generates the red light LR as the fluorescence having a wavelength band of about 585 nm through 720 nm in response to the excitation of the phosphor. The green-light light source device 101G efficiently generates the green light LG as the fluorescence having a wavelength band of about 495 nm through 585 nm in response to the excitation of the phosphor. The blue-light light source device 101B efficiently generates the blue light LB as the fluorescence having a wavelength band of about 380 nm through 495 nm in response to the excitation of the phosphor.

The red-light liquid crystal light valve 102R, the green-light liquid crystal light valve 102G and the blue-light liquid crystal light valve 102B are each formed of a liquid crystal panel having a liquid crystal layer sandwiched between a pair of glass substrates.

The mode of the liquid crystal layer is not particularly limited, and can be a TN mode, a VA mode, a lateral electric field mode, and so on. The red-light liquid crystal light valve 102R, the green-light liquid crystal light valve 102G and the blue-light liquid crystal light valve 102B modulate the light emitted from the red-light light source device 101R, the green-light light source device 101G and the blue-light light source device 101B, respectively, in accordance with image information.

The red-light light exit side polarization plate 106R, the green-light light exit side polarization plate 106G and the blue-light light exit side polarization plate 106B are disposed on the light exit side of the red-light liquid crystal light valve 102R, the green-light liquid crystal light valve 102G and the blue-light liquid crystal light valve 102B, respectively. The red-light light exit side polarization plate 106R, the green-light light exit side polarization plate 106G and the blue-light light exit side polarization plate 106B transmit light (S-polarized light) different in polarization direction from the light emitted from the red-light light source device 101R, the green-light light source device 101G and the blue-light light source device 101B, respectively.

The color combining element 103 is formed of a cross dichroic prism or the like. The cross dichroic prism has a structure having four triangular prisms bonded to each other. The surfaces of the triangular prisms bonded to each other form internal surfaces of the cross dichroic prism. In the internal surfaces of the cross dichroic prism, a dichroic surface reflecting the red light and transmitting the green light, and a dichroic surface reflecting the blue light and transmitting the green light are perpendicular to each other.

The green light LG having entered the cross dichroic prism is transmitted through the two dichroic surfaces, and is emitted directly. The red light LR and the blue light LB having entered the cross dichroic prism are selectively reflected by either one of the dichroic surfaces, and are then emitted in the same direction as the emission direction of the green light LG. In such a manner as described above, the three colors of light are superimposed to thereby be combined with each other, and the colored light thus combined is emitted toward the projection optical device 104.

In the color combining element 103, in order to efficiently combine the red light LR, the green light LG and the blue light LB with each other, it is desirable that the red light LR and the blue light LB to be reflected by either one of the dichroic surfaces are made S-polarized light, and the green light LG to be transmitted through the both dichroic surfaces is made P-polarized light at the moment when entering the color combining element 103.

However, the light emitted from the red-light light source device 101R and then emitted from the red-light light exit side polarization plate 106R described above, the light emitted from the green-light light source device 101G and then emitted from the green-light light exit side polarization plate 106G described above and the light emitted from the blue-light light source device 101B and then emitted from the blue-light light exit side polarization plate 106B described above are each S-polarized light. Therefore, in the present embodiment, the ½ wave plate 108 is disposed between the green-light liquid crystal light valve 102G and the color combining element 103 out of the light paths of the three colors of light. Thus, only the green light LG out of the three colors of light entering the color combining element 103 can be made P-polarized light.

The projection optical device 104 is constituted by, for example, a plurality of lenses, and projects the light modulated by the red-light liquid crystal light valve 102R, the light modulated by the green-light liquid crystal light valve 102G and the light modulated by the blue-light liquid crystal light valve 102B. In other words, the image light, which has been emitted from the color combining element 103, is projected by the projection optical device 104 on the screen SCR as the projection target surface.

The projector 100 according to the present embodiment is equipped with the light source devices 10 according to the first embodiment, and is therefore high in light use efficiency and can display a bright image on the screen SCR.

It should be noted that the scope of the present disclosure is not limited to the embodiments described above, but a variety of modifications can be provided thereto within the scope or the spirit of the present disclosure.

The specific configurations such as the shape, the size, the number, the arrangement, and the material of each of the constituents constituting the light source device are not limited to those of the embodiments described above, but can arbitrarily be modified.

For example, although in the embodiments described above, the case of disposing the reflecting mirror 15 so as to be opposed to a part of the side surfaces of the light guide 13 is cited as an example, it is also possible to dispose the reflecting mirror 15 on the entire area of the side surfaces of the light guide 13.

Further, although in the embodiment described above, there is described the example of the case of applying the present disclosure to the transmissive projector, the present disclosure can also be applied to a reflective projector. Here, "transmissive" means that the liquid crystal light valve including the liquid crystal panel and so on has a configuration of transmitting the light. The term "reflective" means that the liquid crystal light valve has a configuration of reflecting the light. It should be noted that the light modulation device is not limited to the liquid crystal light valve, but it is also possible to use, for example, a digital micromirror device.

Further, although in the embodiment described above, there is cited the example of the projector using the three liquid crystal light valves, the present disclosure can also be applied to a projector using one liquid crystal light valve alone or a projector using four or more liquid crystal light valves.

Further, although in the embodiment described above, there is described the example of installing the light source device according to the present disclosure in the projector, this is not a limitation. The light source device according to the present disclosure can also be applied to lighting equipment, a headlight of a vehicle, and so on.

What is claimed is:

1. A light source device comprising:
a light source section configured to emit excitation light;
a phosphor excited by the excitation light to emit fluorescence;
a light guide having a light incidence surface on which the fluorescence is incident, a light exit surface from which the fluorescence is emitted and a side surface crossing the light incidence surface and the light exit surface, and configured to propagate light entered an inside of the light guide;
a reflective polarization element disposed so as to be opposed to the light exit surface of the light guide, and configured to reflect first polarized light with a first polarization direction out of the fluorescence emitted from the light exit surface, and transmit second polarized light with a second polarization direction different from the first polarization direction out of the fluorescence emitted from the light exit surface; and
a reflecting member disposed so as to be opposed to at least a part of the side surface of the light guide, wherein
the phosphor is disposed at a position opposed to the light incidence surface of the light guide.

2. The light source device according to claim 1, wherein the reflecting member is disposed on the light incidence surface side of a middle part of the light guide.

3. The light source device according to claim 1, wherein the reflecting member is opposed to the light guide across a space.

4. The light source device according to claim 3, further comprising:
a low refractive index layer which is lower in refractive index than the light guide, and which is disposed in the space.

5. The light source device according to claim 4, wherein the low refractive index layer is formed of a first air layer.

6. The light source device according to claim 1, wherein the light guide is a taper rod with the side surface having a shape tilted with respect to the light incidence surface and the light exit surface.

7. The light source device according to claim 1, further comprising:
a second air layer disposed between the phosphor and the light incidence surface of the light guide.

8. The light source device according to claim 1, wherein the light source section includes a laser light source.

9. A projector comprising:
the light source device according to claim 1;
a light modulation device configured to modulate light from the light source device in accordance with image information; and
a projection optical device configured to project the light modulated by the light modulation device.

* * * * *